United States Patent [19]

Seki et al.

[11] Patent Number: 4,914,599
[45] Date of Patent: Apr. 3, 1990

[54] METHOD OF CREATING NC PART PROGRAM LASER MACHINING

[75] Inventors: Masaki Seki; Takashi Takegahara; Toru Matsunaka, all of Tokyo, Japan

[73] Assignee: Fanuc Ltd., Minamitsuru, Japan

[21] Appl. No.: 207,154

[22] PCT Filed: Oct. 15, 1987

[86] PCT No.: PCT/JP87/00774
§ 371 Date: Jun. 8, 1988
§ 102(e) Date: Jun. 8, 1988

[87] PCT Pub. No.: WO88/02884
PCT Pub. Date: Apr. 21, 1988

[30] Foreign Application Priority Data
Oct. 15, 1986 [JP] Japan ................. 61-244473

[51] Int. Cl.[4] .................................. G05B 19/407
[52] U.S. Cl. .................. 364/474.08; 219/121.82; 318/568.1; 364/474.23; 364/474.29; 364/474.3
[58] Field of Search .................. 364/191–193, 364/474.08, 474.23, 474.28, 474.29, 474.3, 474.31; 318/568, 573, 568.1; 219/121.6, 121.78–121.82

[56] References Cited

U.S. PATENT DOCUMENTS

| | | | |
|---|---|---|---|
| 4,503,493 | 3/1985 | Burkhardt et al. | 364/474.29 |
| 4,543,625 | 9/1985 | Nozawa et al. | 364/474.29 X |
| 4,555,610 | 11/1985 | Polad et al. | 364/474.08 X |
| 4,648,024 | 3/1987 | Kato et al. | 364/474.29 |
| 4,700,314 | 10/1987 | Kinoshita | 364/474.29 X |
| 4,757,459 | 7/1988 | Lauchnor et al. | 364/474.23 X |

Primary Examiner—Joseph Ruggiero
Attorney, Agent, or Firm—Staas & Halsey

[57] ABSTRACT

A machining condition modification definition statement (11b) is created, in an automatic programming language, specifying a machining condition modification interval at a corner portion of a part and machining conditions in this interval. A figure definition statement (11a) and a motion definition statement (11c) are created in accordance with part shape without taking the machining condition modification interval and machining conditions into consideration. When these definition statements are converted into an NC part program for laser machining executable by an NC unit, the corner portion of the part is divided into two or more machining condition modification intervals in accordance with the machining condition modification definition statement, and an NC part program for laser machining is created in such a manner that the set machining conditions will prevail in each of the intervals.

6 Claims, 8 Drawing Sheets

| COMMAND | $F_1$ | $F_2$ | $F_3$ | $F_4$ | $F_5$ | $F_6$ | $F_7$ | $F_8$ | $F_9$ |
|---|---|---|---|---|---|---|---|---|---|
| SETTING OF COORDINATE SYSTEM | 8502 | 0001 | 0101 | 0201 | 0004 | | | | |
| POSITIONING / LINER CUTTING | 8202 | 8002 | 0001 | 0101 | 0201 | 0104 | 0004 | | |
| CIRCULAR ARC CUTTING | 8202 | 8012 | 0001 | 0101 | 0301 | 0401 | 0004 | | |
| TOOL SELECTION | --- | --- | --- | --- | --- | --- | --- | --- | |
| SPINDLE SPEED | --- | --- | --- | --- | --- | --- | --- | --- | |
| NCDT | --- | --- | --- | --- | --- | --- | --- | --- | |

| FUNCTION CODE | NC DATA OUTPUT FORMAT |
|---|---|
| 0000 | NO FUNCTION |
| XX00 | FEED OUTPUT    XX - NUMBER OF FEED OUTPUT |
| 0001 | X-AXIS POSITION DATA OUTPUT    X○○---○ |
| 0101 | Y-AXIS POSITION DATA OUTPUT    Y○○---○ |
| 0201 | Z-AXIS POSITION DATA OUTPUT    Z○○---○ |
| 0301 | X-AXIS POSITION DATA OUTPUT FOR CENTER OF CIRCULAR ARC  I○○---○ |
| 0401 | Y-AXIS POSITION DATA OUTPUT FOR CENTER OF CIRCULAR ARC  J○○---○ |
| 0141 | F-CODE OUTPUT    F○○○ |
| --- | --- |
| 8002 | POSITIONING OR LINEAR CUTTING G-CODE OUTPUT    G00 OR G01 |
| 8012 | CLOCKWISE OR COUNTER-CLOCKWISE CIRCULAR ARC CUTTING G-CODE OUTPUT  G02 OR G03 |
| 8202 | ABSOLUTE OR INCREMENTAL COMMAND G-CODE OUTPUT  G90 OR G91 |
| --- | --- |
| 8502 | COORDINATE SYSTEM SETTING G-CODE OUTPUT    G50 |
| --- | --- |
| 0004 | EOB (END-OF-BLOCK OUTPUT)    EOB |
| 0104 | EOR (REWIND STOP CODE) OUTPUT    % |

FNT

METHOD OF CREATING NC PART PROGRAM LASER MACHINING

DESCRIPTION

TECHNICAL FIELD

This invention relates to a method of creating an NC part program for laser machining and, more particularly, to an NC part program creation method capable of improving machining precision at corners.

BACKGROUND ART

In an automatic programming apparatus for creating NC data using an automatic programming language such as APT or FAPT, (a) a part program based on the automatic programming language is created by defining points, straight lines and circular arcs using simple symbols (this is referred to as "figure definition"), and then defining a tool path using the defined points, straight lines and circular arcs (referred to as "motion statement definition"), and (b) the part program based on the automatic programming language is subsequently converted, by using an NC data output table, into NC data comprising NC data (EIA codes or ISO codes) in a format capable of being executed by an NC unit. It should be noted that the tools used include, in addition to ordinary tools, the wire in a wire-cut electrical discharge machine, the laser beam in a laser processing machine, etc.

Figure 9:
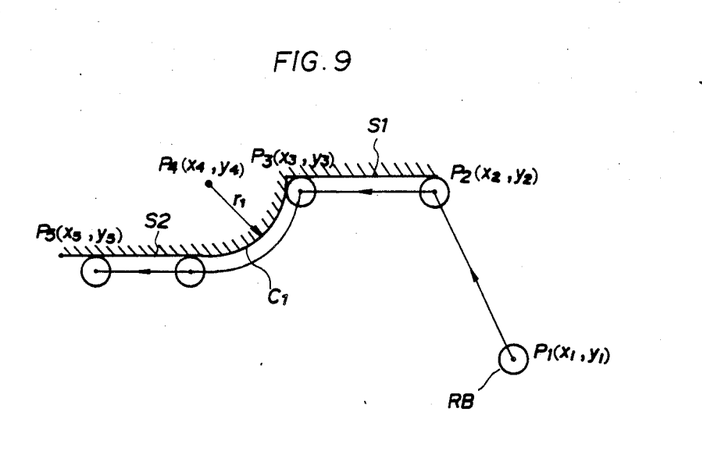
FIG. 9 is a view for describing automatic programming according to the prior art.

For example, in the creation of a part program for moving a tool (laser beam) RB along a profile comprising straight lines and circular arcs shown in FIG. 9, figure definition is performed by defining a tool starting point $P_1$, cutting starting point $P_2$, straight lines $S_1$, $S_2$ and circular arc $C_1$ ... as follows:

| | | |
|---|---|---|
| PART, @ REIDAI | ... | (1) |
| MCHN, LASER, ABS | ... | (2) |
| $P_1 = x_1, y_1$ | | |
| $P_2 = x_2, y_2$ | | |
| $P_3 = x_3, y_3$ | | |
| $S_1 = P_2, P_3$ | ... | (3) |
| $C_1 = x_4, y_4, r_1$ | ... | (4) |
| $P_5 = x_5, y_5$ | | |
| $S_2 = P_5, C_1, B$ | ... | (5) |

Thereafter, by using these defined points, straight lines and circular arc, a motion statement is defined in automatic programming language, the motion statement being in line with the following and the tool path:

| | | |
|---|---|---|
| CUTTER, 0.3 | ... | (6) |
| S0800 | ... | (7) |
| TLLFT | ... | (8) |
| FROM, $P_1$ | ... | (9) |
| RPD, TO, $S_1$, $P_2$ | ... | (10) |
| FCOD, 500 | ... | (11) |
| $S_1$ | | |
| $C_1$ | | |
| $S_2$ | | |
| ... | | |
| FINI | | |
| PEND | | |

When this is inputted to an automatic programming unit, the latter subsequently creates and outputs NC data having an EIA code or ISO code execution format automatically while referring to an NC data output table.

In the foregoing, (1) instructs the start of the part program, with "REIDAI" being the header.

(2) indicates the type of NC machine. "MILL" is used in case of milling, "TURN" in case of turning, "CUT" in case of a wire-cut electrical discharge machine, and "LASER" in case of laser machining. "ABS" indicates an absolute command. ("INCR" would be used for an incremental command.)

(3) signifies a straight line passing through points $P_2$, $P_3$.

(4) signifies a circular arc of center $(x_4, y_4)$ and radius $r_1$.

(5) signifies a lower tangent line (straight line) of two tangent lines passing through point $P_5$ and contacting the circular arc $c_1$. In the case of the upper tangent line, the alphabetic character A would be used instead of B.

(6) represents a beam command which commands a beam diameter of 0.3 mm.

(7) represents a command indicating that the laser power is 800W.

(8) is a command for offsetting the tool (laser beam) to the left of the direction of movement. ("TLRGT" would be used to offset the tool to the right of the direction of movement.)

(9) is a coordinate system setting command which indicates that the starting point is $P_1$.

(10) is a command for positioning the tool in such a manner that the tool will contact the straight line $S_1$ at point $P_2$ without passing this straight line.

(11) is a velocity command indicating that the feed velocity is 500 mm/min.

Figure 10:
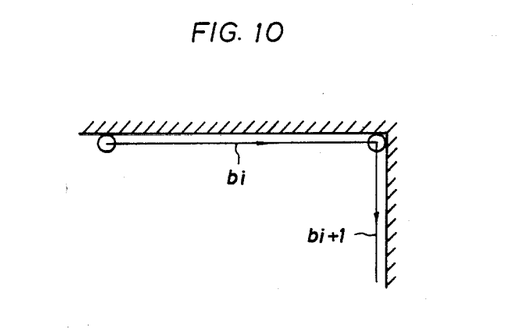
FIGS. 10 and 11 are views for describing a disadvantage of the prior-art method.
Figure 11:
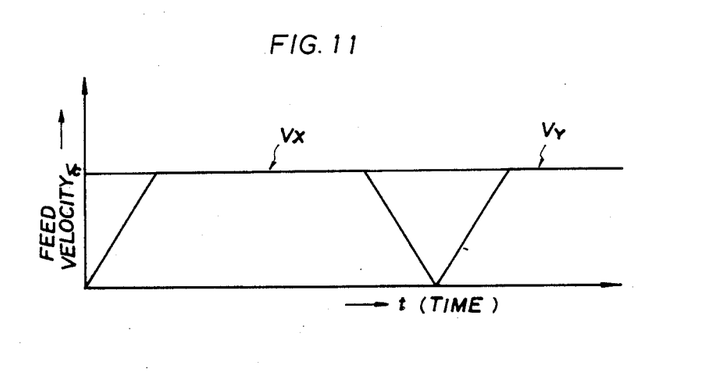

When a tool path includes a corner, the tool feed velocity in the vicinity of the corner generally cannot be held constant because of the characteristics of the machine, etc. For example, if an i-th block $b_i$ and an $(i+1)$th block $b_{i+1}$ of the tool path intersect perpendicularly, as shown in FIG. 10, the tool feed velocity is as shown in FIG. 11. Thus, deceleration and acceleration are required when passing the corner portion. In other words, in the vicinity of the corner, the feed velocity along the X axis is reduced from the commanded velocity $V_c$ and attains a value of zero, after which the feed velocity $V_y$ along the Y axis is increased to reattain the commanded velocity $V_c$.

This deceleration and acceleration of feed at the corner portion has a deleterious effect upon the machining precision of the part. In particular, altering the feed velocity causes machining droop and has considerable influence upon machining precision in cases where a high machining velocity is required, as in laser machining.

Accordingly, it is necessary that an NC part program be created in such a manner that the machining precision at the corner portion does not suffer. To this end, the conventional practice is to check whether or not it is necessary to alter machining conditions at a corner portion each time and create a figure definition statement and motion definition statement depending on whether or not alteration of machining conditions is necessary. However, creating an NC program in accordance with this conventional method is a major undertaking.

Accordingly, in International Application PCT/JP87/00626 (international filing date: Aug. 26, 1987), the inventors proposed a novel method of creating an NC part program for laser machining However, this international application does not give a detailed disclosure concerning a method of specifying machining condition modification intervals and machining conditions.

An object of the present invention is to provide a method of simply creating an NC part program for laser machining in which machining precision at corner portions can be maintained.

Another object of the present invention is to provide a method of creating an NC part program for laser machining in which a machining condition modification interval and machining conditions can be simply specified and revised.

DISCLOSURE OF THE INVENTION

A machining condition modification definition statement is created, in an automatic programming language, specifying a machining condition modification interval at a corner portion of a part and machining conditions in this interval. A figure definition statement and a motion definition statement are created in accordance with part shape without taking the machining condition modification interval and machining conditions into consideration. When these definition statements are converted into an NC part program for laser machining executable by an NC unit, the corner portion of the part is divided into two or more machining condition modification intervals in accordance with the machining condition modification definition statement, and an NC part program for laser machining is created in such a manner that the set machining conditions will prevail in each of the intervals.

BRIEF DESCRIPTION OF THE DRAWINGS

FIGS. 1a and 1b is a view for describing the general features of the present invention, in which FIG. 1(a) is a view for describing a part program using an automatic programming language, and FIG. 1(b) is a view of a machined shape;

BEST MODE FOR CARRYING OUT THE INVENTION

Figure 1A:
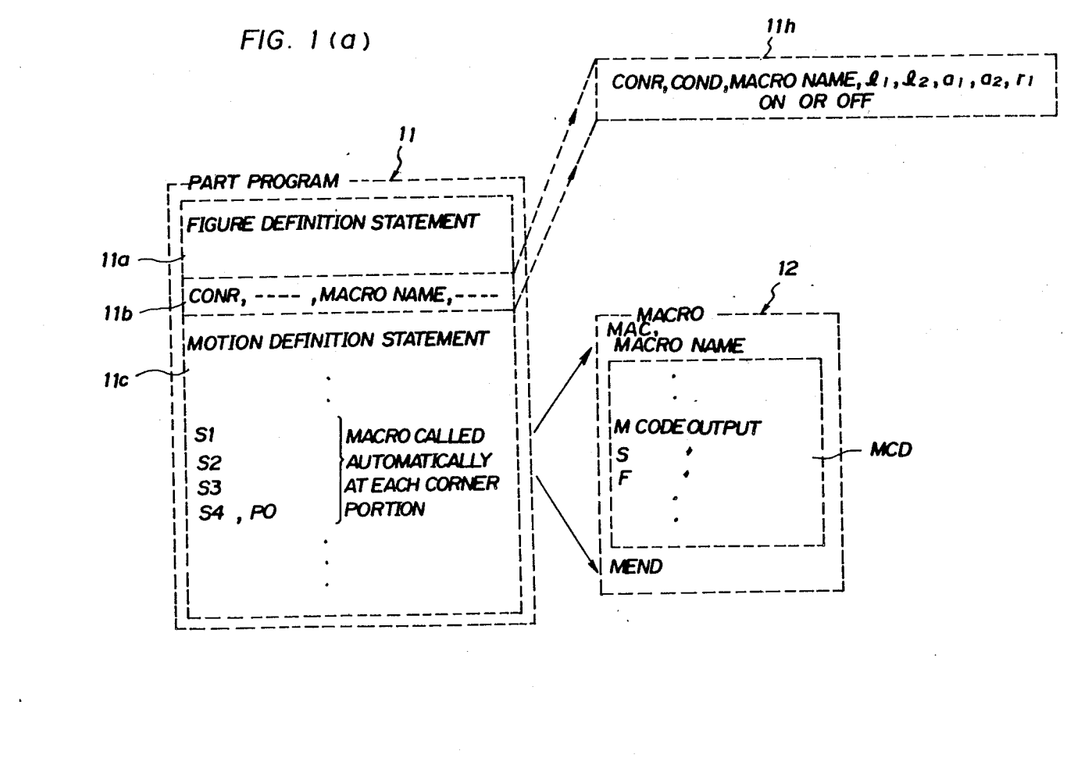
Figure 1B:
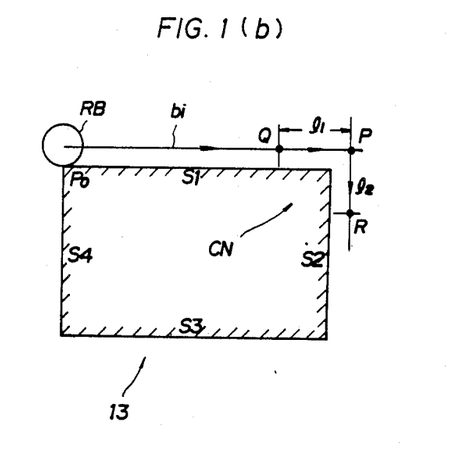

FIGS. 1a and 1b are views for describing the general features of the present invention, in which FIG. 1a is a view for describing a part program using an automatic programming language, and FIG. 1b is a view of a machined shape.

Numeral 11 denotes a part program, 11a a figure definition statement, 11b a machining condition modification definition statement, 11c a motion definition statement, 12 a macro, 13 a rectangular part comprising linear elements S1–S4, RB a laser beam, CN a corner portion, and P the end point of an i-th block $b_i$. An interval QP is a first machining condition modification interval, and an interval PR is a second machining condition modification interval. These intervals have respective lengths $l_1$, $l_2$ measured from the end point P.

The machining conditions (laser beam feed velocity, laser power value, laser output method, etc.) at the corner portion CN [FIG. 1(b)] are specified by M-, S- and F-codes and the like and are registered in advance as the macro 12. A plurality of such macros are registered in accordance with the machining condition modification intervals and machining conditions.

The machining condition modification definition statement 11b is generated. This statement includes the data (lengths $l_1$, $l_2$) specifying the machining condition modification intervals QP, PR at corner portion CN, and the name of the macro specifying the machining conditions in these intervals. This machining condition modification definition statement is inputted to an automatic programming apparatus together with the figure definition statement 11a and motion definition statement 11c, which are prepared without taking into consideration the machining condition modification intervals and the machining conditions in these intervals.

In converting the definition statements created using automatic programming language into an NC part program executable by an NC unit, the automatic programming apparatus divides the corner portion CN into two or more machining condition modification intervals QP, PR by using the machining condition modification definition statement, and creates an NC part program in such a manner that the machining conditions set by the macro 12 will prevail in each of the intervals.

More specifically, NC data are created for effecting movement at predetermined machining conditions (machining conditions specified by the motion definition statement) up to the point Q, NC data are created for effecting movement from point Q to point P at the machining conditions set by the macro 12, and NC data are similarly created for effecting movement from point P to point R at the machining conditions set by the macro 12.

Figure 2:
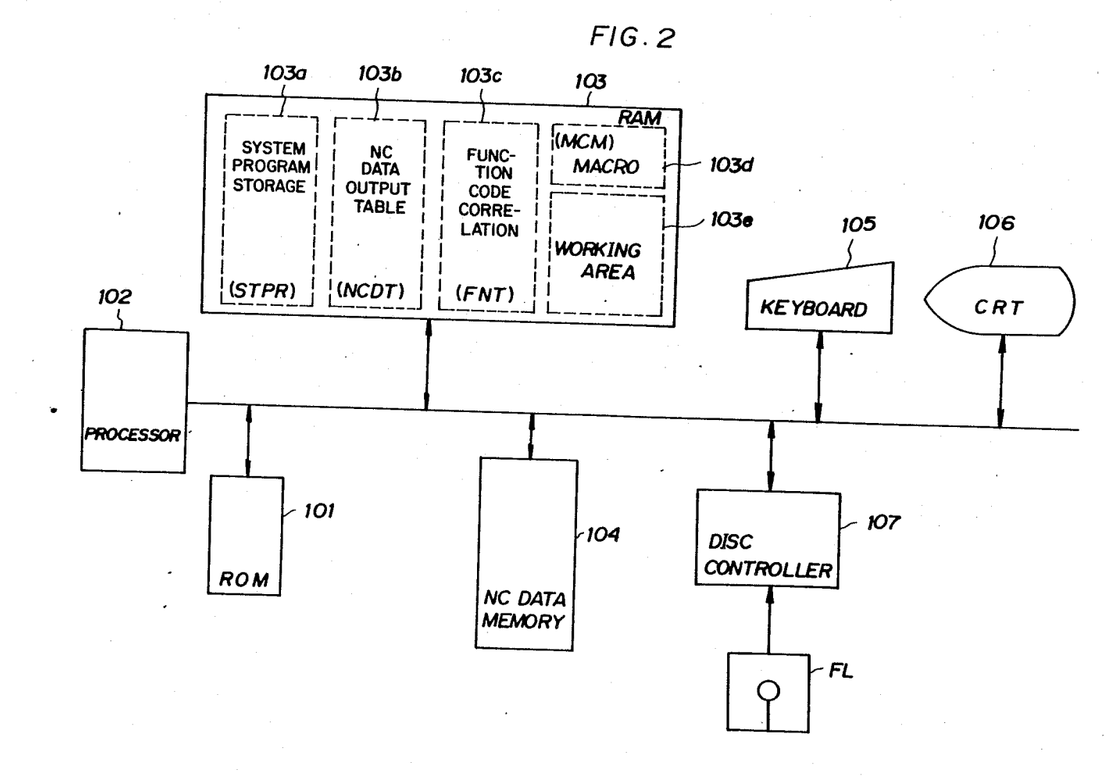
FIG. 2 is a block diagram of an automatic programming apparatus for practicing the present invention.

FIG. 2 is a block diagram of an automatic programming apparatus according to an embodiment of the present invention.

Numeral 101 denotes a ROM storing a loading program and the like, 102 a processor for executing automatic programming processing, and 103 a RAM.

The RAM 103 has a storage area 103a for storing a system program STPR read in from a floppy disc, a storage area 103b for storing an NC data output table, a storage area 103c for storing a correlation FNT between function codes and ND data output formats, a storage area 103d for storing various macros MCM, and a working area 103e.

Figure 3:
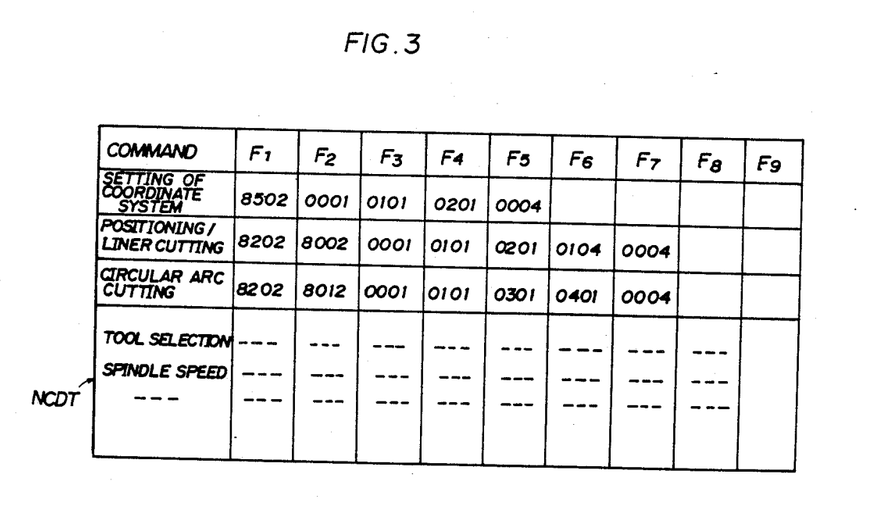
FIG. 3 is a view for describing an NC data output table.

The NC data output table NCDT stored in the storage area 103b has a plurality of function codes F1–F9 specifying NC data output formats for each command, as shown in FIG. 3. Each function code is expressed by four hexadecimal digits. NC data having one execution format are specified by a set of several of these function codes.

Figure 4:
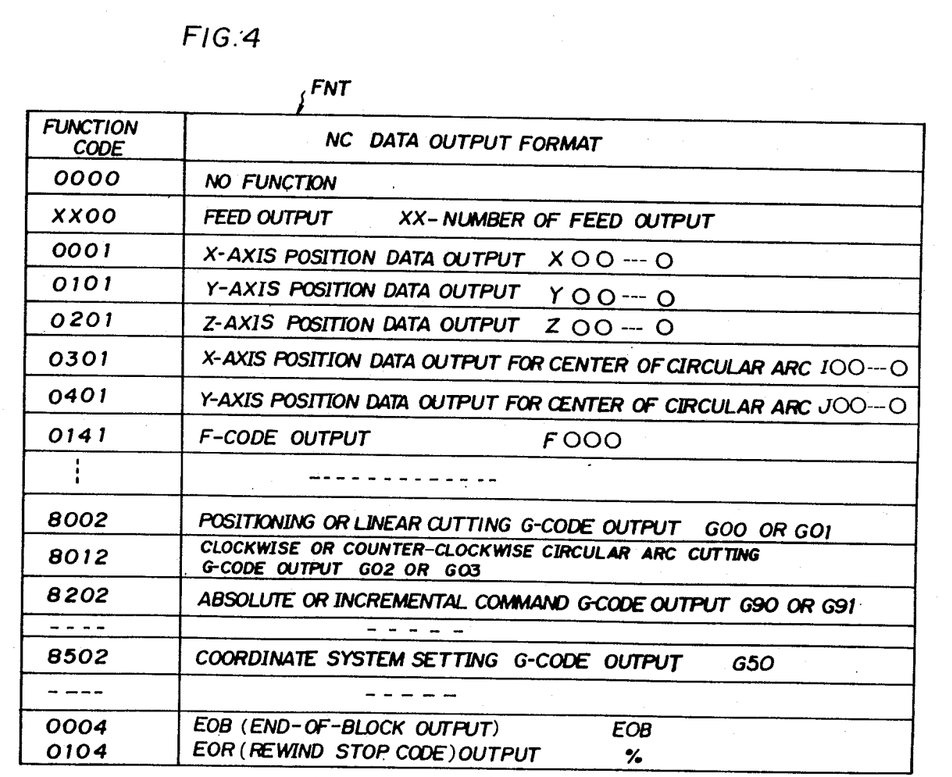
FIG. 4 is a view showing the correlation between function codes and NC data output formats.

Some correlations between function codes stored in storage area 103c and NC output formats are shown in FIG. 4. A coordinate system setting NC data output format in the NC data output table NCDT of FIG. 3 is 8502, 0001, 0101, 0201, 0004

Therefore, the NC data having the execution format for setting the coordinate system is G50XxYyZzEOB ... (a)

This is obtained by referring to the correlations between function codes and output formats in FIG. 4. The NC data output format for positioning/linear cutting is 8202, 8002, 0001, 0101,
0201, 0141, 0004

The NC data having the execution format for positioning/linear cutting is

G90(G91)G00(G01)XxYyZzFfEOB ... (b)

This is obtained by referring to the correlations between function codes and output formats in FIG. 4. The NC data output format for circular arc cutting is 8202, 8012, 0001, 0101,
0301, 0401, 0004

The NC data having the execution format for circular arc cutting is

G90(G91)G02(G02)XxYyIiJjEOB ... (c)

This is obtained by referring to the correlations between function codes and output formats in FIG. 4.

Returning to FIG. 2, numeral 104 denotes an NC data memory for storing the NC data created, 105 a keyboard, 106 a display unit (CRT), 107 a disc controller, and FL a floppy disc.

Figure 5:
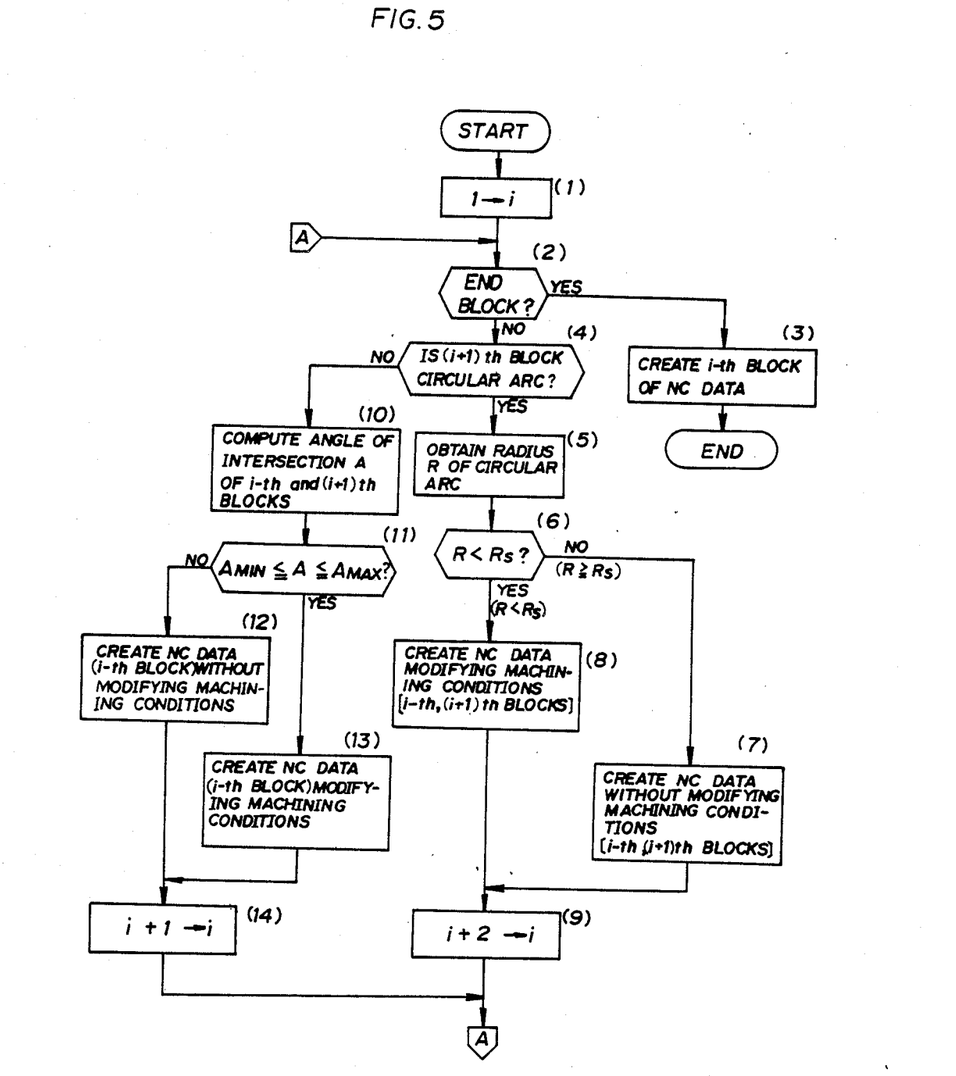
FIG. 5 is a flowchart of processing according to the invention.
Figure 6:
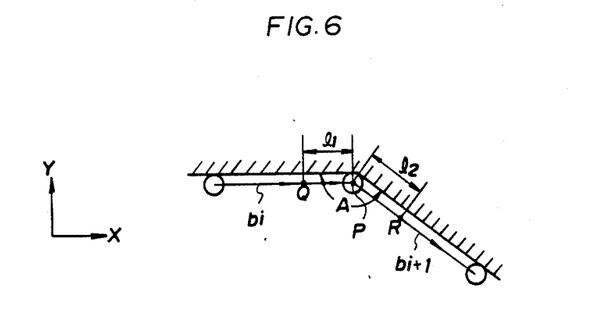
FIG. 6 is a view for describing a machining condition modification definition statement in a case where a corner is formed by two linear elements.
Figure 7:
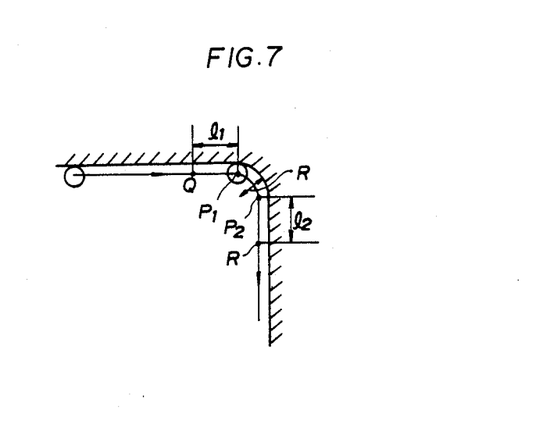
FIG. 7 is a view for describing a machining condition modification definition statement in a case where a corner is a circular arc.

FIG. 5 is a flowchart of processing according to the present invention, FIG. 6 is a view for describing a machining condition modification definition statement in a case where a corner is formed by two linear elements, FIG. 7 is a view for describing a machining condition modification definition statement in a case where a corner is a circular arc, and FIG. 8 is a view for describing machining condition modification interval data relating to various corner shapes.

Processing according to the present invention will now be described with reference to FIGS. 1 through 8(A). It is assumed that the system program for creating an NC part program for laser machining, the NC data output table NCDT, the correlations FNT between the function codes and NC data output formats, and various macros specifying machining conditions have been stored in the storage areas 103a–103d of the RAM 103 from the floppy disc FL. As shown in FIG. 1(a), macros are composed of a macro name MAC, machining conditions MCD and a macro end (MEND), and machining conditions are specified by an F-code indicating laser beam feed velocity, an S-code indicating laser beam power, and an M-code indicating laser output format (continuous or intermitten oscillation). A corner portion is divided into n-number of machining condition modification intervals. If the machining conditions in each interval differ, then a total of n sets of machining conditions are specified by one macro to correspond to each interval. If the machining conditions are the same in each interval, then only one set of machining conditions is specified by one macro.

(1) First, the machining condition modification definition statement 11b (see FIG. 1) is created. This statement includes the data specifying the machining condition modification intervals at the corner portion, and the name of the macro specifying the machining conditions in these intervals. The figure definition statement 11a and motion definition state 11c are prepared without taking into consideration the machining condition modification intervals and the machining conditions, and these are inputted to the automatic programming apparatus. In response, the processor 201 performs the operation 1→i.

It should be noted that the machining condition modification definition statement 11b is composed of CONR, COND, MACRO NAME, $l_1, l_2, a_1, a_2, r_1$
ON or OFF as shown in FIG. 1. Except for "CORN, COND, ON or OFF", the characters denote parameters, in which the machining condition modification intervals are specified by $l_1, l_2$, and corner shape conditions which determine whether machining conditions are to be modified are specified by $a_1, a_2$ and $r_1$. More specifically, if a corner portion is composed of two linear elements (see FIG. 6), machining condition modification intervals are specified by the distances $l_1, l_2$ from a point P at which offset paths intersect. If the corner portion is a circular arc (see FIG. 7), then machining condition modification intervals are specified by the distances $l_1, l_2$ from the starting point $P_1$ of the circular arc and the end point $P_2$ of the circular arc, respectively. Further, a maximum opening angle $A_{MAX}$ of the corner portion and a minimum opening angle $A_{MIN}$ of the corner portion are specified by $a_1, a_2$, respectively. If the corner angle A satisfies the relation $A_{MIN} < A < A_{MAX}$, then the machining conditions are modified in the machining condition modification intervals. The radius $R_s$ of the corner arc is specified by $r_1$. If the corner arc radius R satisfies the relation $R < R_s$, the machining conditions are modified in the machining condition modification intervals.

Machining condition modification processing for the corner portion is executed in response to "ON", and machining condition modification processing is not executed if "OFF" is in effect.

(2) A check is performed to determine whether the i-th block is the final block.

(3) If the i-th block is the final block, then processing for NC part program creation is terminated upon creating the i-th block of NC data.

(4) If the i-th block is not the final block at step (2), then it is determined whether the (i+1)th block is a circular arc.

(5) If this block is a circular arc, the corner radius R is calculated; if not, the program jumps to the tenth step.

(6) When the radius R of the corner arc has been found, it is determined whether $R < R_s$ holds by using the arc radius $R_s$ contained in the machining condition modification definition statement 11b.

(7) If $R \geq R_s$ holds, the i-th block (straight line) and (i+1)th block (circular arc) of NC data are created without performing machining condition modification The reason for not modifying the machining conditions when $R \geq R_s$ holds is that there is little change in laser beam feed velocity at the corner and, hence, little appreciable influence upon machining precision.

(8) If $R < R_s$ holds, however, three machining condition modification intervals $QP_1$, $P_1P_2$, $P_2R$ (see FIG. 7) are obtained using $l_1$, $l_2$ contained in the machining condition modification definition statement 11b and NC data are created in such a manner that the machining conditions specified by the macro will prevail in each interval.

More specifically, NC data are created for effecting movement at predetermined machining conditions (machining conditions specified by the motion definition statement) up to the point Q, NC data are created for effecting movement from point Q to point $P_1$ at first machining conditions designated by the macro, NC data are similarly created for effecting movement from point $P_1$ to point $P_2$ at second machining conditions designated by the macro, and NC data are created for effecting movement from point $P_2$ to point R at third machining conditions designated by the macro. If the machining conditions are the same in each of the intervals, it will suffice to specify one set of machining conditions by the macro. Therefore, the first through third machining conditions will be identical.

(9) At the end of the processing for steps (7) and (8), i is incremented by the operation i+2→i and then the processing from step (2) onward is repeated.

(10) If the result of the determination made at the fourth step is that the (i+1)th block is a straight line, the angle A (see FIG. 6) at which the i-th block and (i+1)th block intersect is computed.

(11) Next, it is determined whether $A_{MIN} \leq A \leq A_{MAX}$ holds by using the maximum opening angle $A_{MAX}$ and minimum opening angle $A_{MIN}$ contained in the machining condition modification statement 11b.

(12) If $A_{MIN} \leq A \leq A_{MAX}$ does not hold, the i-th block of NC data is created without modifying the machining conditions. The reason for not modifying the machining conditions is that if the corner angle A is acute and fairly large, there is little change in velocity at the corner and, hence, little appreciable influence upon machining precision.

(13) If $A_{MIN} \leq A \leq A_{MAX}$ holds, however, machining condition modification intervals QP, PR (see FIG. 6) are obtained using $l_1$, $l_2$ contained in the machining condition modification definition statement 11b, and NC data are created in such a manner that the machining conditions specified by the macro will hold in each of the intervals.

More specifically, NC data are created for effecting movement at predetermined machining conditions (machining conditions specified by the motion definition statement) up to the point Q, NC data are created for effecting movement from point Q to point P at first machining conditions designated by the macro, and NC data are created for effecting movement from point P to point R at second machining conditions designated by the macro. If the machining conditions are the same in each of the intervals, it will suffice to specify one set of machining conditions by the macro. Therefore, the first and second machining conditions will be identical.

(14) At the end of the processing for steps (12) and (13), i is incremented by the operation i+1→i and processing from step (2) onward is repeated.

Figure 8A:
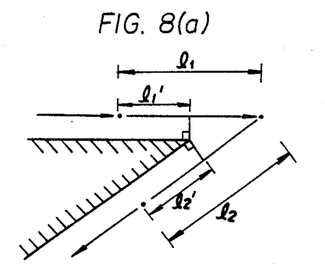
FIGS. 8(a)-8(b) are views for describing machining condition modification interval data relating to various corner shapes.
Figure 8B:
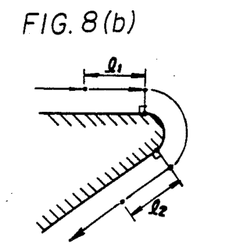
Figure 8C:
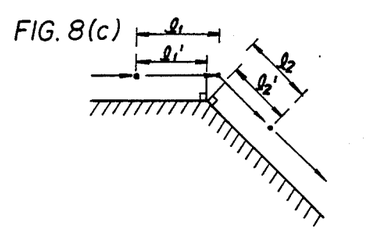
Figure 8D:
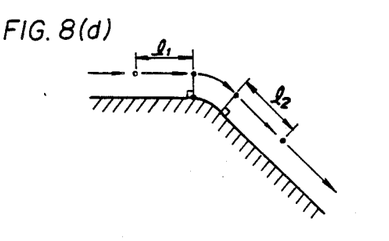
Figure 8E:
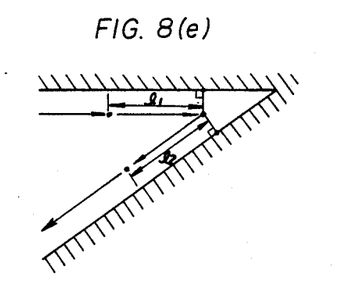
Figure 8F:
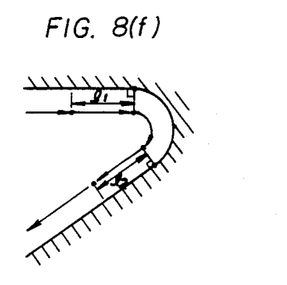
Figure 8G:
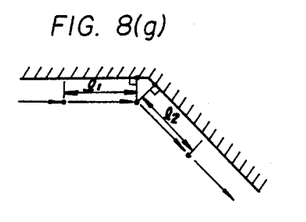
Figure 8H:
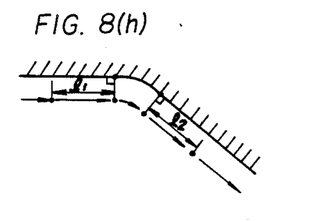

Though the distances $l_1$, $l_2$ are given as the distances from the point of intersection P between the offset paths in the case of FIG. 6, these can be given in the form of distances $l_1'$, $l_2'$ from an apex of the actual shape, as shown in FIGS. 8(a), and 8(c).

In accordance with the present invention, machining condition modification intervals and machining conditions at a corner portion are specified in advance by a machining condition modification definition statement, whereby figure definition and motion definition can be performed without taking these machining condition modification intervals and machining conditions into consideration. As a result, programs using an automatic programming language can be simplified.

In addition, since the arrangement is such that machining conditions are specified in the machining condition modification definition statement by a macro, machining conditions can be modified merely by altering the contents of the macro, and it is unnecessary to modify the body of the part program written in the automatic programming language.

Furthermore, since it is so arranged that machining conditions are set by a macro, machining conditions based on the know-how of the user can be specified in such a manner that they will not become the knowledge of other parties.

We claim:

1. A method of creating an NC part program for laser machining in which a figure definition statement for defining a figure and a motion definition statement for defining a laser beam path are inputted in an automatic programming language, and these definition statements are converted, by using an NC data output table, into a laser machining NC part program executable by an NC unit, which NC part program is then outputted, said method characterized by:

creating a machining condition modification definition statement which includes data specifying a machining condition modification interval at a corner portion of a part and machining conditions in said interval;

creating a figure definition statement and a motion definition statement without taking the machining condition modification interval and machining conditions into consideration;

dividing the corner portion into two or more machining condition modification intervals using said machining condition modification definition statement when a laser machining NC part program executable by the NC unit is created using the definition statements; and creating the laser machining NC part program in such a manner that machining conditions set by the machining condition modification definition statement will prevail in each of the intervals.

2. A method of creating an NC part program for laser machining according to claim 1, characterized in that machining conditions are specified by a macro in each of the machining condition modification intervals in advance, and data specifying the machining conditions in said machining condition modification definition statement is a predetermined macro name.

3. A method of creating an NC part program for laser machining according to claim 2, characterized in that said machining conditions are at least a feed velocity and a laser power value.

4. A method of creating an NC part program for laser machining according to claim 2, characterized in that conditions regarding corner shape for modifying machining conditions are included in said machining condition modification definition statement in advance, and machining conditions at the corner portion are modified only when said corner shape conditions are satisfied.

5. A method of creating an NC part program for laser machining according to claim 4, characterized in that said corner shape conditions are a maximum opening angle $A_{MAX}$ and a minimum opening angle $A_{MIN}$ of the corner portion, and by:

determining an angle A at the corner portion of the beam path, and creating the NC part program in such a manner that the set machining conditions will prevail in said machining condition modification intervals when $A_{MIN} \leqq A \leqq A_{MAX}$ holds.

6. A method of creating an NC part program for laser machining according to claim 4, characterized in that said corner shape condition is a radius $R_s$ of a corner arc, and when an arc is present at the corner of the beam path, a radius R of said arc is determined, the NC part program being created in such a manner that said set machining conditions will prevail in said machining condition modification intervals when $R \leqq R_s$ holds.

* * * * *